(12) United States Patent
Downie et al.

(10) Patent No.: US 7,016,583 B2
(45) Date of Patent: Mar. 21, 2006

(54) DISPERSION MANAGEMENT WITH PHASE CONJUGATION

(75) Inventors: John D. Downie, Painted Post, NY (US); James M. Grochocinski, Corning, NY (US); Shiva Kumar, Painted Post, NY (US)

(73) Assignee: Corning Incorporated, Corning, NY (US)

(*) Notice: Subject to any disclaimer, the term of this patent is extended or adjusted under 35 U.S.C. 154(b) by 208 days.

(21) Appl. No.: 10/736,821

(22) Filed: Dec. 15, 2003

(65) Prior Publication Data

US 2004/0151452 A1 Aug. 5, 2004

Related U.S. Application Data

(60) Provisional application No. 60/444,286, filed on Jan. 31, 2003.

(51) Int. Cl.
*G02B 6/02* (2006.01)
*G02B 6/26* (2006.01)

(52) U.S. Cl. ......................................... 385/123; 385/27
(58) Field of Classification Search .................. 385/95, 385/96, 98, 122–124, 27, 24; 359/334, 341.1, 359/341.3
See application file for complete search history.

(56) References Cited

U.S. PATENT DOCUMENTS

| | | | |
|---|---|---|---|
| 5,365,362 A | 11/1994 | Gnauck et al. | 359/174 |
| 5,386,314 A | 1/1995 | Jopson | 359/326 |
| 5,532,868 A | 7/1996 | Gnauck et al. | 359/332 |
| 5,694,239 A | 12/1997 | Shigematsu et al. | 359/332 |
| 5,754,334 A | 5/1998 | Artiglia et al. | 359/332 |
| 5,778,128 A * | 7/1998 | Wildeman | 385/123 |
| 5,798,853 A | 8/1998 | Watanabe | 359/160 |
| 5,861,970 A | 1/1999 | Tatham et al. | 359/161 |
| 5,920,588 A | 7/1999 | Watanabe | 372/96 |
| 6,128,118 A | 10/2000 | Marcenac | 359/173 |
| 6,160,942 A | 12/2000 | Watanabe | 385/122 |
| 6,175,435 B1 | 1/2001 | Watanabe | 359/161 |
| 6,304,348 B1 | 10/2001 | Watanabe | 359/124 |
| 6,307,984 B1 * | 10/2001 | Watanabe | 385/24 |
| 6,341,026 B1 | 1/2002 | Watanabe | 359/161 |
| 6,377,740 B1 * | 4/2002 | Onishi et al. | 385/123 |
| 6,483,633 B1 | 11/2002 | Onishi et al. | 359/341.31 |
| 6,504,972 B1 | 1/2003 | Watanabe | 385/24 |
| 6,608,854 B1 | 8/2003 | Watanabe | 372/96 |
| 2002/0012148 A1 | 1/2002 | Oksanen | 359/161 |

FOREIGN PATENT DOCUMENTS

| | | |
|---|---|---|
| EP | 0 643 498 | 8/1994 |
| EP | 0 987 583 | 3/2000 |

(Continued)

OTHER PUBLICATIONS

Yu et al., "Effect of Residual Dispersion in the Phase-Conjugation Fiber on Dispersion Compensation in Optical Communication Systems", IEEE Photonics Technology Letters, vol. 7, No. 8, Aug. 1995, pps. 932-934.

(Continued)

*Primary Examiner*—Frank G. Font
*Assistant Examiner*—Michael P. Mooney
(74) *Attorney, Agent, or Firm*—Joseph M. Homa

(57) ABSTRACT

An optical transmission system is provided. The system includes first and second lines of optical fiber, each line including first, second, and third optical fiber portions, and an optical phase conjugator optically coupling the first and second lines. The first and third optical fiber portions have a local dispersion of like sign to each other, and opposite to the sign of the second optical fiber portion.

20 Claims, 5 Drawing Sheets

FOREIGN PATENT DOCUMENTS

| EP | 1 133 031 | 9/2001 |
|----|-----------|--------|
| WO | WO 2004/057779 | 7/2004 |

OTHER PUBLICATIONS

Kikuchi et al., "*Compensation for Pulse Waveform Distortion in Ultra-Long Distance Optical Communication Systems by using Midway Optical Phase Conjugator*", IEEE Photonics Technology Letters, vol. 6, No. 1, Jan. 1994, pps. 104-105.

Kurtzke, "*Optical-Phase Conjugation—A New Approach To Future High-Capacity Optical Communication Systems*", IEE Colloquium on High Capacity Optical Communication, London, UK, May 16, 1994, pps. 8/1-8/6.

Zou et al., "*Limitations in Number of WDM Channels When Using Dispersion Management and Mid-Span Phase Conjugation*", 1995 Digest of the LEOS Summer Topical Meetings, Aug. 7-11, 1995, pps. 14-15.

Watanabe, "*High Speed Fiber Transmission using Optical Phase Conjugation*", LEOS Annual Meeting, vol. 2, Oct. 30-31, 1995, pps. 355-356.

Watanabe et al., "*Compensation of Chromatic Dispersion in a Single-Mode Fiber by Optical Phase Conjugation*", IEEE Photonics Technology Letters, vol. 5, Issue 1, Jan. 1993, pps. 92-95.

Watanabe et al., "*Compensation of Pulse Shape Distortion Due to Chromatic Dispersion and Kerr Effect by Optical Phase Conjugation*", IEEE Photonics Technology Letters, vol. 5, Issue 10, Oct. 1993, pps. 1241-1243.

Watanabe et al., "*Generation of Optical Phase-Conjugate Waves and Compensation for Pulse Shape Distortion in a Single-Mode Fiber*", Journal of Lightwave Technology, vol. 12, Issue 12, Dec. 1994, pps. 2139-2146.

Watanabe et al., "*Cancellation of four-wave mixing in multichannel fibre transmission by midway optical phase conjugation*", Electronics Letters, vol. 30, No. 14, Jul. 7th, 1994, pps. 1156-1157.

Watanabe et al., "*Exact Compensation for both Chromatic Dispersion and Kerr Effect in a Transmission Fiber Using Optical Phase Conjugation*", Journal of Lightwave Technology, vol. 14, No. 3, Mar. 1996, pps. 243-248.

* cited by examiner

DISPERSION MANAGEMENT WITH PHASE CONJUGATION

CROSS-REFERENCE TO RELATED APPLICATIONS

This application claims the benefit of, and priority to, U.S. Provisional Patent Application No. 60/444,286 filed on Jan. 31, 2003.

FIELD OF INVENTION

This invention relates to an optical transmission system having dispersion managed optical fiber and optical phase conjugation. The transmission system and method are particularly applicable to high power, long distance transmission systems, including optically transparent systems.

BACKGROUND OF THE INVENTION

Since the development and widespread implementation of Erbium-doped fiber amplifiers (EDFAs) the development of optical fiber based communication systems has been a balance between various factors. The additive Gaussian noise induced by EDFAs drives systems to use higher launched powers to increase the signal to noise ratio (SNR) so that low bit error rates (BERs) can be maintained. However, because of non-linear effects in optical fiber, when the launched power is too great impairments are induced that can severely limit performance. Examples of such impairments are self-phase modulation (SPM), cross-phase modulation (XPM), and four-wave mixing (FWM). Therefore, for each system there will be some optimal launched power that maximizes SNR without introducing limiting non-linear penalties.

Dispersion is a physical property of optical fibers that can induce system penalties, and is most difficult to manage for high local dispersion fibers, long reach systems, and high bit rate systems. In the absence of non-linear impairments, the ideal fiber dispersion would be zero. However, this greatly enhances FWM. Therefore, another balancing to be managed is the need to have overall low accumulated dispersion in a system with sufficiently high local dispersion to manage FWM and other non-linear penalties. Appropriate choice of a dispersion map in the system can reduce non-linear penalties and can enable use of higher launched powers.

Dispersion units are typically given as picoseconds/nanometer-kilometer (ps/nm-km), where the kilometer units correspond to the length of the fiber. The dispersion product of a span of fiber is a measure of the dispersion accumulated over the span. The dispersion product for a fiber of length L with a dispersion D is the product of L and D, i.e., L·D. Thus, the dispersion product of a span of fiber having individual section of length $L_i$ and dispersion $D_i$ is the sum of the individual dispersion products $\Sigma L_i \cdot D_i$ at a given wavelength.

Nonlinear optical effects (such as four-wave mixing (FWM) and Cross-Phase Modulation (XPM)) can degrade the optical signal transmission through long-haul optical networks. Increasing the dispersion in the fibers decreases both FWM and XPM. Dispersion causes broadening in transmitted optical pulses due to the difference in transmission speeds of light at different wavelengths. Because the group velocity difference between channels is proportional to dispersion, a larger group velocity difference between channels implies that one channel walks over the other channel at a very fast rate and collision length is very short. If collision occurs very rapidly, the impact of the collision is minimal. Therefore, it is advantageous to have large dispersion so that collision length is short.

While dispersion reduces nonlinear effects such as FWM and XPM, the accumulated dispersion in these long-haul systems must be compensated. In long-haul repeatered transmission systems using optical fibers, the interplay of the accumulation of large amounts of the chromatic dispersion and self-phase modulation (SPM), creates noise and distortion in the optical system. Dispersion maps, i.e., the dispersion as a function of the transmission distance, attempt to minimize the effects of chromatic dispersion.

Another balancing to be managed in optically transparent networks is the choice between the optimal dispersion map to suppress non-linear penalties and the best map to facilitate all-optical networks. For high bit rate (>40 Gb/s) RZ systems, non-linear impairments can be reduced when the local dispersion is very large and the accumulated dispersion before compensation is also large. However, such dispersion maps may be difficult to manage in an optically transparent network, for example because signals arriving at a switching node may have significantly different accumulated dispersion values, inhibiting the ease and accuracy of optical performance monitoring (OPM).

One known attempt at balancing these considerations is to use dispersion managed fiber or cable which can provide relatively low-loss spans, large local dispersion and zero accumulated dispersion on a span-by-span basis. However, certain non-linear penalties—inter-channel XPM (xXPM) and intra-channel XPM (sXPM)—are reasonably enhanced when each span has zero accumulated residual dispersion. Another known technique proposed in the literature uses an optical phase conjugator, which inverts the phase induced by the non-linear interactions so that propagation forward from the location of the phase conjugator will undo the non-linear phase, but the technique does not utilize dispersion symmetry about the point of phase conjugation.

BRIEF SUMMARY OF THE INVENTION

An optical transmission system is disclosed herein which includes optical fiber and transmits in a wavelength range bounded by a first wavelength and a second wavelength. Preferably, dispersion symmetry, and more preferably both dispersion and power symmetry, about the point of phase conjugation are implemented in order to minimize the effects of nonlinearities. The optical transmission system may also include a plurality of optical amplifiers that are positioned at one or more optical component sites to amplify the optical signal.

In a first set of embodiments, an optical transmission system for transmitting in a wavelength range is disclosed herein, the system comprising: a first optical fiber line comprising first, second, and third sequential optical fiber portions, wherein the first optical fiber portion has a dispersion with a first dispersion sign at a wavelength within the wavelength range, wherein the second optical fiber portion has a dispersion with a second dispersion sign at the wavelength opposite to the first dispersion sign, and wherein the third optical fiber portion has a dispersion with the first dispersion sign at the wavelength; a second optical fiber line comprising first, second, and third sequential optical fiber portions, wherein the first optical fiber portion has a dispersion with the first dispersion sign at the wavelength, wherein the second optical fiber portion has a dispersion with the second dispersion sign at the wavelength, and wherein the third optical fiber portion has the first dispersion sign at the wavelength; and an optical phase conjugator disposed between the first and second optical fiber lines, wherein the optical phase conjugator is optically coupled to the third optical fiber portion of the first optical fiber line and is optically coupled to the first optical fiber portion of the second optical fiber line.

Preferably, the first and third fiber portions of both the first and second fiber lines comprise the same fiber type.

Preferably, the second fiber portions of both the first and second fiber lines comprise the same fiber type.

In one preferred embodiment, an optical amplifier is disposed between, and optically coupled to, the third fiber portion of the first optical fiber line and the optical phase conjugator.

In another preferred embodiment, an optical amplifier is disposed between, and optically coupled to, the optical phase conjugator and the first fiber portion of the second optical fiber line.

In a preferred embodiment, the system further comprises a two-stage amplifier disposed between, and optically coupled to, the first and second optical fiber lines. Preferably, the optical phase conjugator is disposed mid-stage in the two-stage amplifier.

Preferably, at the wavelength, the sum of the dispersion products of the optical fiber portions of the first optical fiber line and the sum of the dispersion products of the optical fiber portions of the second optical fiber line do not differ by more than 10%.

The system further preferably comprises a plurality of sets of sequential dispersion managed lines, each sequential set comprising respective first and second optical fiber lines optically coupled by a respective optical phase conjugator. The system also further preferably comprises an optical network comprised of a plurality of network portions, each network portion comprising at least one sequential set. Preferably, the system further comprises a transmitter optically coupled to the optical network, wherein the transmitter launches an optical signal into the optical network, and a receiver optically coupled to the optical network, wherein the receiver receives the optical signal from the optical network.

The system may further comprise at least one initial optical fiber line arranged between the transmitter and the optical network and optically coupling the transmitter and the optical fiber network. Preferably, the at least one initial optical fiber line has a fiber length of between 0 and 50 km.

The system may further comprise at least one final optical fiber line arranged between the receiver and the optical fiber network and optically coupling the optical fiber network and the receiver, wherein the sum of the dispersion products of the optical fiber lines between the transmitter and the receiver is substantially zero at the wavelength.

Preferably, the sum of the dispersion products of the optical fiber lines between the transmitter and the receiver is substantially zero for a given wavelength in the wavelength range.

In another set of embodiments disclosed herein, an network capable of carrying signals in a wavelength range is provided, the network comprising: a plurality of sequential optical component sites optically connected by a plurality of dispersion managed spans, the plurality of sequential optical component sites including first, second and third component sites; wherein each dispersion managed span comprises M optical fiber portions of a first optical fiber type interconnected by N optical fiber portions of a second optical fiber type in an alternating arrangement of the first and second optical fiber types, wherein M is an even integer not less than two, and N is an odd integer not less than one; wherein the optical fiber portions of each dispersion managed span have optical fiber portions of alternating first and second optical fiber types; wherein the M optical fiber portions have a dispersion sign at a wavelength within the wavelength range, and wherein the N optical fiber portions have a dispersion sign at the wavelength opposite to the dispersion sign of the M optical fiber portions at the wavelength; and wherein the second optical component site includes an optical phase conjugator; wherein the dispersion managed span connecting the first and second optical component sites has the same number of M and N optical fiber portions as the dispersion managed span connecting the second and third optical component sites.

In another set of embodiments, an optical transmission system for transmitting in a wavelength range is disclosed herein, the system comprising a plurality of sequential optical component sites optically connected by a plurality of dispersion managed spans, the plurality of sequential optical component sites including first, second and third component sites, wherein each dispersion managed span comprises M optical fiber portions of a first optical fiber type interconnected by N optical fiber portions of a second optical fiber type in an alternating arrangement of the first and second optical fiber types, wherein M is an even integer not less than two, and N is an odd integer not less than one, wherein the optical fiber portions of each dispersion managed span have optical fiber portions of alternating first and second optical fiber types, wherein the M optical fiber portions have a dispersion sign at a wavelength within the wavelength range, and wherein the N optical fiber portions have a dispersion sign at the wavelength opposite to the dispersion sign of the M optical fiber portions at the wavelength, and wherein the second optical component site includes an optical phase conjugator, wherein the dispersion managed span connecting the first and second optical component sites has the same number of M and N optical fiber portions as the dispersion managed span connecting the second and third optical component sites.

In a preferred embodiment, at least one of the first and third optical component sites includes an optical phase conjugator.

Preferably, the dispersion managed span connecting the first and second optical component sites comprises an optical fiber portion of the first optical fiber type coupled to the first optical component site, and an optical fiber portion of the first optical fiber type coupled to the second optical component site.

Preferably, the dispersion managed span connecting the second and third optical component sites comprises an optical fiber portion of the first optical fiber type coupled to the second optical component site, and an optical fiber portion of the first optical fiber type coupled to the third optical component site.

Preferably, at least one of the first, second and third optical component sites includes an optical amplifier. In a preferred embodiment, at least one of the first, second and third optical component sites includes a two stage optical amplifier.

In a preferred embodiment, the second optical component site includes a two stage optical amplifier, and wherein the optical phase conjugator is disposed mid-stage within the two stage optical amplifier.

The system further preferably comprises a Raman amplifier coupled to an optical fiber portion adjacent the second optical component site. In a preferred embodiment, the Raman amplifier is disposed at the second optical component site.

Preferably, the system further comprises a plurality of sets of sequential dispersion managed spans, each set comprising respective first and second dispersion managed spans optically coupled by a respective optical phase conjugator.

The system may further comprise an optical network comprised of a plurality of network portions, each network portion comprising at least one sequential set of sequential dispersion managed spans.

Preferably, the system further comprises a transmitter optically coupled to the optical network, wherein the transmitter launches an optical signal into the optical network, and a receiver optically coupled to the optical network, wherein the receiver receives the optical signal from the optical network.

The system may further comprise at least one initial optical fiber line arranged between the transmitter and the optical network and optically coupling the transmitter and the optical fiber network. In one preferred embodiment, the at least one initial optical fiber line has a fiber length of between 0 and 50 km.

The system may further comprise at least one final optical fiber line arranged between the receiver and the optical fiber network and optically coupling the optical fiber network and the receiver, wherein the sum of the dispersion products of the optical fiber lines between the transmitter and the receiver is substantially zero at the wavelength.

Preferably, the sum of the dispersion products of the optical fiber lines between the transmitter and the receiver is substantially zero at the wavelength.

In other embodiments disclosed herein, methods of transmitting an optical signal between a transmitter and a receiver in a wavelength range are provided corresponding to the above optical transmission systems. One embodiment is a method of transmitting optical signals, the method comprising transmitting at least one signal at a wavelength through a first dispersion managed span, an optical phase conjugator, and a second dispersion managed span, wherein the first and second spans have substantially similar dispersion profiles at the wavelength. The method further preferably comprises providing distributed Raman amplification to the spans. The method further preferably comprises providing substantially similar power profiles to the optical signal in the first and second spans. The method further preferably comprises providing a plurality of optical component sites between a plurality of dispersion managed spans, wherein an optical phase conjugator optically connects pairs of dispersion managed spans. In one embodiment, each optical component site contains an optical phase conjugator. In another embodiment, alternating optical component sites contain an optical phase conjugator.

DETAILED DESCRIPTION OF THE PREFERRED EMBODIMENTS

Preferably, the optical fibers in an optical transmission system are arranged to yield an average chromatic dispersion near zero for all the channels having wavelengths within the transmission wavelength range. Furthermore, the average dispersion of each channel should be substantially different from zero in each transmission span to reduce XPM effects, but should be periodically compensated to limit the accumulated dispersion. The dispersion compensation scheme should result in an increased number of channels over long distances for transmission applications which use a number of channels for transmission, such as wavelength division multiplexing (WDM). Significant cost savings can also be had by eliminating most of the dispersion compensation at the transmitter and receiver ends of the transmission system.

Figure 1:
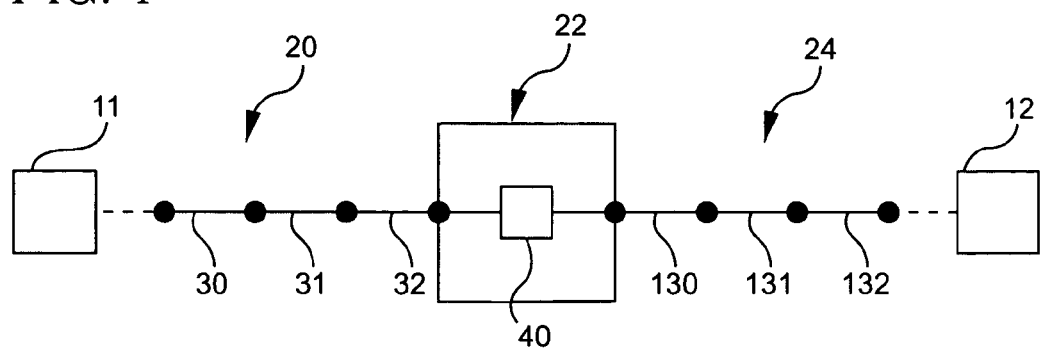
FIG. 1 is a schematic of an optical transmission system 10 as disclosed herein.

FIG. 1 is a schematic of an optical transmission system 10 as disclosed herein comprising a first dispersion managed span, or optical fiber line, 20, optically coupled to an optical component site 22, and a second dispersion managed span, or optical fiber line, 24, optically coupled to the optical component site 22. The system 10 includes a transmitter 11 and a receiver 12. The first dispersion managed span, or optical fiber line, 20, the optical component site 22, and the second dispersion managed span, or optical fiber line, 24, comprise an optical network, or at least a portion of an optical network, which is optically coupled to the transmitter 11 and receiver 12. The respective dotted lines connecting the transmitter 11 and receiver 12 to the optical network in FIG. 1 represent the possibility that other system components and/or optical fiber lines may be included in the system 10.

The first optical fiber line 20 comprises first, second, and third optical fiber portions 30, 31, 32, consecutively arranged, and the second optical fiber line 24 comprises first, second, and third optical fiber portions 130, 131, 132, consecutively arranged. An optical phase conjugator 40 is disposed at the optical component site 22 and is optically coupled to the first dispersion managed span, or optical fiber line, 20, at the third optical fiber portion 32, and is optically coupled to the second dispersion managed span, or optical fiber line, 22, at the first optical fiber portion 130.

In preferred embodiments, first and third optical fiber portions 30, 32 and first and third optical fiber portions 130, 132 are of the same optical fiber type, wherein the dispersion of the optical fiber portions 30, 32, 130, 132 each have the same dispersion sign (positive or negative) at a given or chosen wavelength within the wavelength range of operation in the system, and wherein the second optical fiber portions 31, 131 are of the same optical fiber type, wherein the dispersion of the optical fiber portions 31, 131 each have the same dispersion sign (negative or positive) at the given wavelength, but wherein the dispersion sign of the portions 31, 131 are opposite to the dispersion sign of portions 30, 32, 130, 132 at that wavelength. Thus, the second optical fiber portion acts to compensate for the accumulated dispersion in the first and third optical fiber portions.

In one preferred embodiment, the dispersion of the optical fiber portions 30, 32, 130, 132 each have a positive dispersion sign at a given wavelength within the wavelength range, and the dispersion of the optical fiber portions 31, 131 each have a negative sign at the given wavelength. In an alternate embodiment, the dispersion of the optical fiber portions 30, 32, 130, 132 each have a negative dispersion sign at a given wavelength within the wavelength range, and the dispersion of the optical fiber portions 31, 131 each have a positive sign at the given wavelength.

Figure 2:
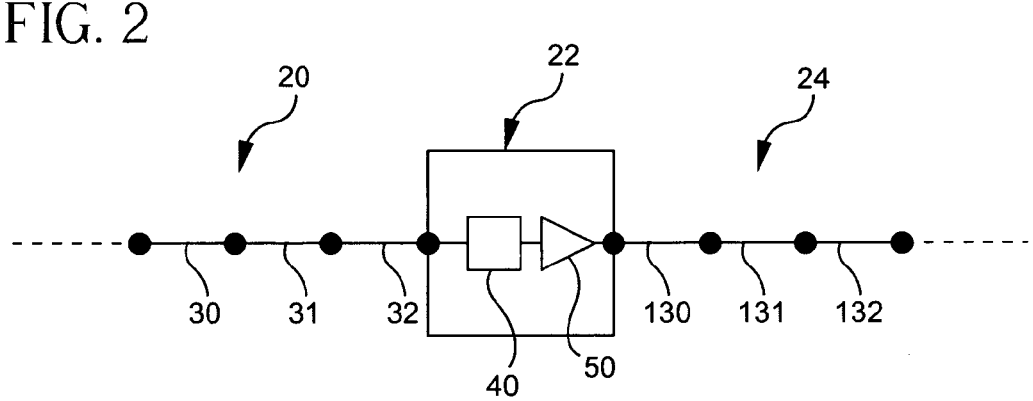
FIG. 2 is a schematic of an optical component site wherein an optical phase conjugator is disposed upstream of an amplifier with respect to the direction of signal travel, as disclosed herein.

FIG. 2 is a schematic of an optical component site 22 comprising an optical phase conjugator 40 and an amplifier 50, wherein the optical phase conjugator 40 is disposed upstream of the amplifier 50 with respect to the direction of signal travel. The amplifier may be, for example, an erbium doped fiber amplifier (EDFA).

Figure 3:
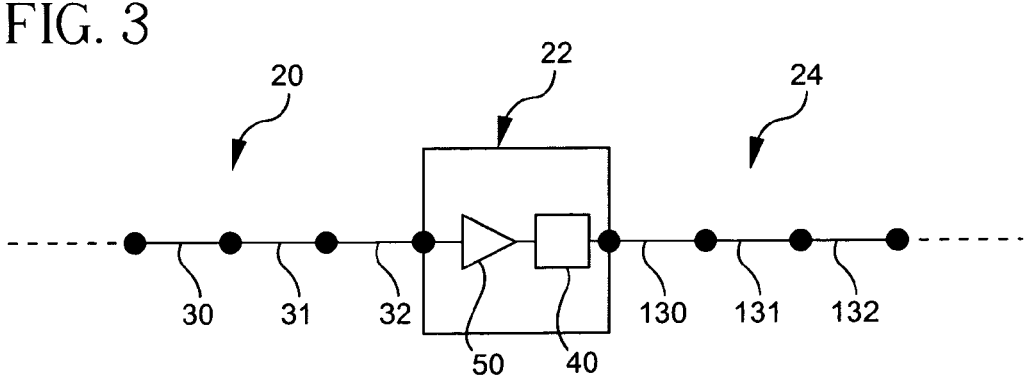
FIG. 3 is a schematic of an optical component site wherein an optical phase conjugator is disposed downstream of an amplifier with respect to the direction of signal travel, as disclosed herein.

FIG. 3 is a schematic of an optical component site 22 comprising an optical phase conjugator 40 and an amplifier 50, wherein the optical phase conjugator 40 is disposed downstream of the amplifier 50 with respect to the direction of signal travel.

Figure 4:
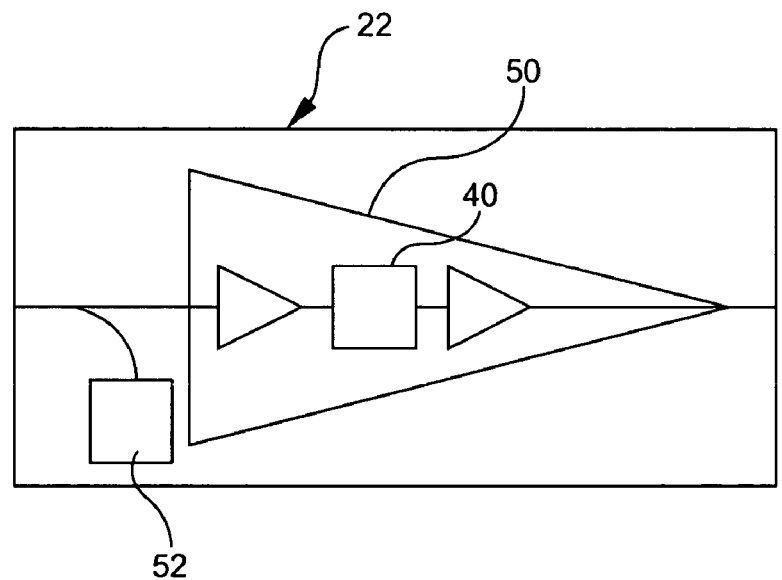
FIG. 4 is a schematic of an optical component site comprising a two-stage amplifier, wherein an optical phase conjugator is disposed mid-stage within the amplifier, as disclosed herein.

FIG. 4 is a schematic of an optical component site 22 comprising a two-stage amplifier, wherein the optical phase conjugator disposed mid-stage within the amplifier. The optical component site 22 also comprises a Raman amplifier 52 for backward pumping with respect to the direction of signal travel.

Figure 5:
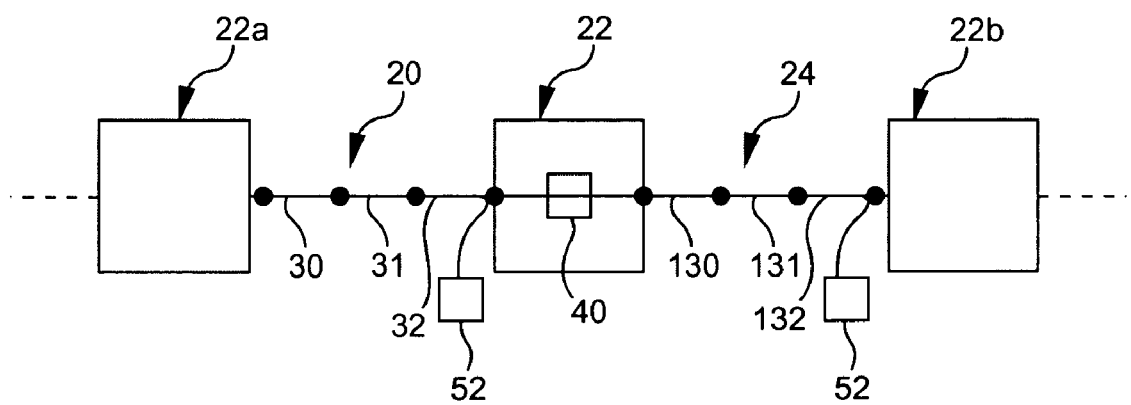
FIG. 5 is a schematic of at least part of an optical network, as disclosed herein, comprising first and second dispersion managed spans, or optical fiber lines, optically coupled to an optical component site.

FIG. 5 is a schematic of an optical network, or at least a portion of an optical network, comprising a first dispersion managed span, or optical fiber line, 20, optically coupled to an optical component site 22, and a second dispersion managed span, or optical fiber line, 24, optically coupled to the optical component site 22. The first optical fiber line 20 comprises first, second, and third optical fiber portions 30, 31, 32, consecutively arranged, and the second optical fiber line 24 comprises first, second, and third optical fiber portions 130, 131, 132, consecutively arranged. An optical phase conjugator 40 is disposed at the optical component site 22 and is optically coupled to the first dispersion managed span, or optical fiber line, 20, at the third optical fiber portion 32, and is optically coupled to the second dispersion managed span, or optical fiber line, 22, at the first optical fiber portion 130. The first optical fiber portion 30 is optically coupled to an optical component site 22a, and the third optical fiber portion 132 is optically coupled to an optical component site 22b. Optical component sites 22a and/or 22b may comprise respective optical phase conjugators and/or amplifiers. Raman amplifiers 52 are optically coupled to the third optical fiber portions 32, 132 in order to make the power profile symmetric.

Figure 6:
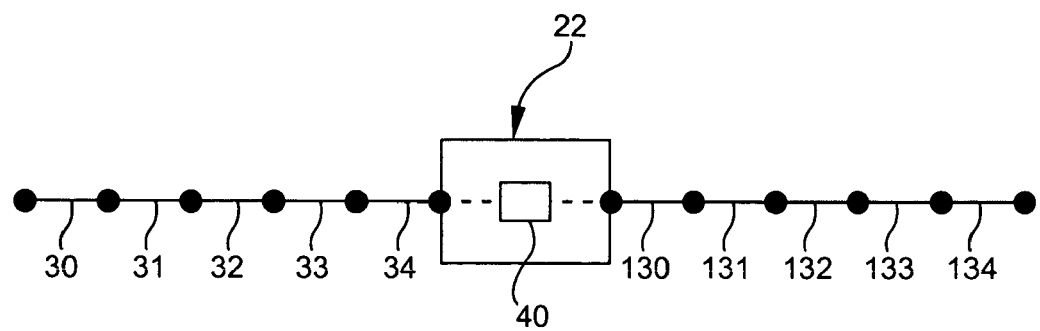
FIG. 6 is a schematic of at least part of an optical network, as disclosed herein, comprising first and second dispersion managed spans, or optical fiber lines, optically coupled to an optical component site, wherein both the first and second spans comprise a plurality of optical fiber portions of a first type and a plurality of optical fiber portions of a second type.

FIG. 6 is a schematic of an optical network, or at least a portion of an optical network, comprising a first dispersion managed span, or optical fiber line, 20, optically coupled to an optical component site 22, and a second dispersion managed span, or optical fiber line, 24, optically coupled to the optical component site 22. The first optical fiber line 20 comprises first, second, third, fourth, and fifth optical fiber portions 30, 31, 32, 33, and 34, consecutively arranged, and the second optical fiber line 24 comprises first, second, third, fourth, and fifth optical fiber portions 130, 131, 132, 133, and 134, consecutively arranged. An optical phase conjugator 40 is disposed at the optical component site 22 and is optically coupled to the first dispersion managed span, or optical fiber line, 20, at the fifth optical fiber portion 34, and is optically coupled to the second dispersion managed span, or optical fiber line, 22, at the first optical fiber portion 130. In preferred embodiments, first, third and fifth optical fiber portions 30, 32, 34 and first, third and fifth optical fiber portions 130, 132, 134 are of the same optical fiber type, wherein the dispersion of the optical fiber portions 30, 32, 34, 130, 132, 134 each have the same dispersion sign (positive or negative) at a given wavelength within the wavelength range of operation in the system, and wherein the second optical fiber portions 31, 33, 131, 133 are of the same optical fiber type, wherein the dispersion of the optical fiber portions 31, 33, 131, 133 each have the same dispersion sign (negative or positive) at the given wavelength, but wherein the dispersion sign of the portions 31, 33, 131, 133 are opposite to the dispersion sign of portions 30, 32, 34, 130, 132, 134 at that wavelength.

In a preferred embodiment, the dispersion of the optical fiber portions 30, 32, 34, 130, 132, 134 each have a positive dispersion sign and the dispersion of the optical fiber portions 31, 33, 131, 133 each have a negative dispersion sign at a given wavelength within the wavelength range of operation in the system.

Figure 7:
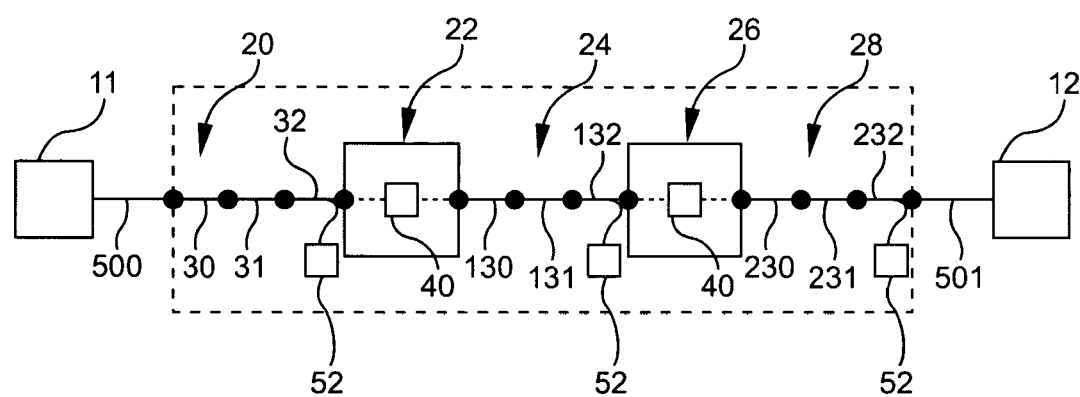
FIG. 7 is a schematic of an optical transmission system, as disclosed herein, comprising a plurality of dispersion managed spans, or optical fiber lines, and a plurality of optical component sites having a plurality of optical phase conjugators.

FIG. 7 is a schematic of an optical transmission system 10 as disclosed herein comprising a first dispersion managed span, or optical fiber line, 20, optically coupled to an optical component site 22, a second dispersion managed span, or optical fiber line, 24, optically coupled to the optical component site 22 and optically coupled to an optical component site 26, and a third dispersion managed span, or optical fiber line, 28, optically coupled to the optical component site 26. The system 10 includes a transmitter 11 and a receiver 12. The first, second, and third dispersion managed spans, or optical fiber lines, 20, 24, 28 and the optical component sites 22, 26, comprise an optical network, or at least a portion of an optical network, which is optically coupled to the transmitter 11 and receiver 12. The first optical fiber line 20 comprises first, second, and third optical fiber portions 30, 31, 32, consecutively arranged, and the second optical fiber line 24 comprises first, second, and third optical fiber portions 130, 131, 132, consecutively arranged, and the third optical fiber line 28 comprises first, second, and third optical fiber portions 230, 231, 232, consecutively arranged. An optical phase conjugator 40 is disposed at the optical component site 22 and is optically coupled to the first dispersion managed span, or optical fiber line, 20, at the third optical fiber portion 32, and is optically coupled to the second dispersion managed span, or optical fiber line, 22, at the first optical fiber portion 130. Another optical phase conjugator 40 is disposed at the optical component site 26 and is optically coupled to the second dispersion managed span, or optical fiber line, 24, at the third optical fiber portion 132, and is optically coupled to the third dispersion managed span, or optical fiber line, 28, at the first optical fiber portion 230. In preferred embodiments, first and third optical fiber portions 30, 32, 130, 132, 230, 232 are of the same optical fiber type, wherein the dispersion of the optical fiber portions 30, 32, 130, 132, 230, 232 each have the same dispersion sign (positive or negative) at a given wavelength within the wavelength range of operation in the system, and wherein the second optical fiber portions 31, 131, 231 are of the same optical fiber type, wherein the dispersion of the optical fiber portions 31, 131, 231 each have the same dispersion sign (negative or positive) at the given wavelength, but wherein the dispersion sign of the portions 31, 131, 231 are opposite to the dispersion sign of portions 30, 32, 130, 132, 230, 232 at that wavelength. In a preferred embodiment, the dispersion of the optical fiber portions 30, 32, 130, 132, 230, 232 each have a positive dispersion sign at a given wavelength within the wavelength range, and the dispersion of the optical fiber portions 31, 131, 231 each have a negative sign at the given wavelength. Raman amplifiers 52 are optically coupled to the third optical fiber portions 32, 132, and 232.

Fiber spans in addition to those forming the spans of the dispersion managed spans or lines can be configured to shape the pulses or compensate the optical signal dispersion. For example, a first set of fiber spans 500 may be placed near the transmitter to broaden the optical pulses, thereby reducing both intra-channel and inter-channel non-linear effects (pre-compensation). In an advantageous embodiment, the effect of the first set of fiber spans can be removed or compensated by a second set of fiber spans 501 placed near the receiver (post-compensation).

The utilization of distributed Raman amplification, with the pumps propagating in a direction opposite to the signals, can provide a means for both the power and the dispersion evolution through the span to be substantially symmetrical with respect to two consecutive optical fiber spans interconnected by an optical phase conjugator.

With appropriate selection of optical fiber types and lengths, dispersion symmetry, and more preferably both dispersion and power symmetry, about the point(s) of phase conjugation can be implemented in order to minimize the effects of nonlinearities.

Preferably, the sum of the lengths of the optical fiber portions of at least one, and more preferably each, dispersion managed span is between 50 km and 120 km.

Preferably the optical power at the first optical component site and the optical power at the second optical component site do not differ by more than 10%.

Preferably, the average dispersion slope in each dispersion managed span at the wavelength is between −0.01 and +0.01 ps/nm2-km.

Preferably, the respective kappas, wherein kappa is defined as the ratio of the dispersion divided by the dispersion slope at a particular wavelength, for each of the optical fiber portions in each of the dispersion managed spans do not differ by more than 10% of each other at the wavelength. More preferably, the respective kappas for each of the optical fiber portions in each of the dispersion managed spans do not differ by more than 10% of each other at all wavelengths within the wavelength range.

In a preferred embodiment, an optical fiber portion of the first optical fiber type has a local dispersion between 15 and 25 ps/nm-km at the wavelength.

In a preferred embodiment, an optical fiber portion of the second optical fiber type has a local dispersion between −20 and −40 ps/nm-km at the wavelength.

Preferably, the first fiber type has a positive dispersion and positive dispersion slope at a given wavelength in the desired operating wavelength range, and the second fiber type has a negative dispersion and negative dispersion slope at the given wavelength in the desired operating wavelength range.

Preferably, the individual respective dispersion products (or accumulated dispersion) of the optical fiber portions are substantially not zero at the wavelength. In general, it is desirable that an optical signal pulse traveling through the optical transmission system will encounter dispersion at each channel wavelength to minimize nonlinear effects.

Preferably, the absolute value of the sum of the dispersion products of the optical fiber portions of at least one, and more preferably each, dispersion managed span is not more than 100 ps/nm at the wavelength.

More preferably, the absolute value of the sum of the dispersion products of the optical fiber portions of at least one, and more preferably each, dispersion managed span is not more than 50 ps/nm at the wavelength.

Even more preferably, the absolute value of the sum of the dispersion products of the optical fiber portions of at least one, and more preferably each, dispersion managed span is not more than 10 ps/nm at the wavelength.

Preferably, the absolute value of the sum of the dispersion products at the wavelength of the optical fiber portions of the span connecting first and second optical component sites and the absolute value of the sum of the dispersion products at the wavelength of the optical fiber portions of the span connecting second and third optical component sites do not differ by more than 10 ps/nm.

In a preferred embodiment, the first optical fiber portion in a span, or line, comprises a fiber with positive dispersion and positive slope at a given wavelength in the operating wavelength range (PDPS fiber), and the second optical fiber portion comprises a fiber with a negative dispersion and a negative at the given wavelength (NDNS fiber). The PDSP and NDNS fibers may be optically coupled directly or via an intermediate fiber to reduce the splice loss. Likewise the third optical fiber portion preferably comprises the same or similar fiber as found in the first optical fiber portion. The first and third optical fiber portions preferably have the same dispersion product throughout the wavelength range, however the first and third optical fiber portions may have different dispersion products.

Preferably, the kappa's, i.e. the ratio of the dispersion and dispersion slope, or the change in dispersion slope per unit wavelength of light, is approximately equal for the fibers in the spans. This allows for the total compensation of dispersion for each wavelength or channel.

Preferably, the first optical fiber portions have different effective areas than the second optical fiber portions, and the third optical fiber portions preferably also have different effective areas than the second optical fiber portions. Preferably, fibers with the largest effective areas are coupled close to the amplifiers (e.g. immediately after a forward pumping EDFA, or immediately before a backward pumping Raman amplifier), because the power density of the transmitted optical pulses should be the greatest immediately at the amplification situs. Furthermore, non-linear effects will also be the greatest at the area where the power density is greatest, i.e. at that location immediate to the amplification. Large effective areas tend to reduce the power density and thus non-linear effects.

Preferably, the PDPS fiber portions have effective areas greater than 50 $\mu m^2$, more preferably greater than 70 $\mu m^2$, even more preferably greater than 80 $\mu m^2$, more preferably still greater than 90 $\mu m^2$. Preferably, the NDNS fiber portions have effective areas less than 50 $\mu m^2$, more preferably less than 40 $\mu m^2$.

Figure 8:
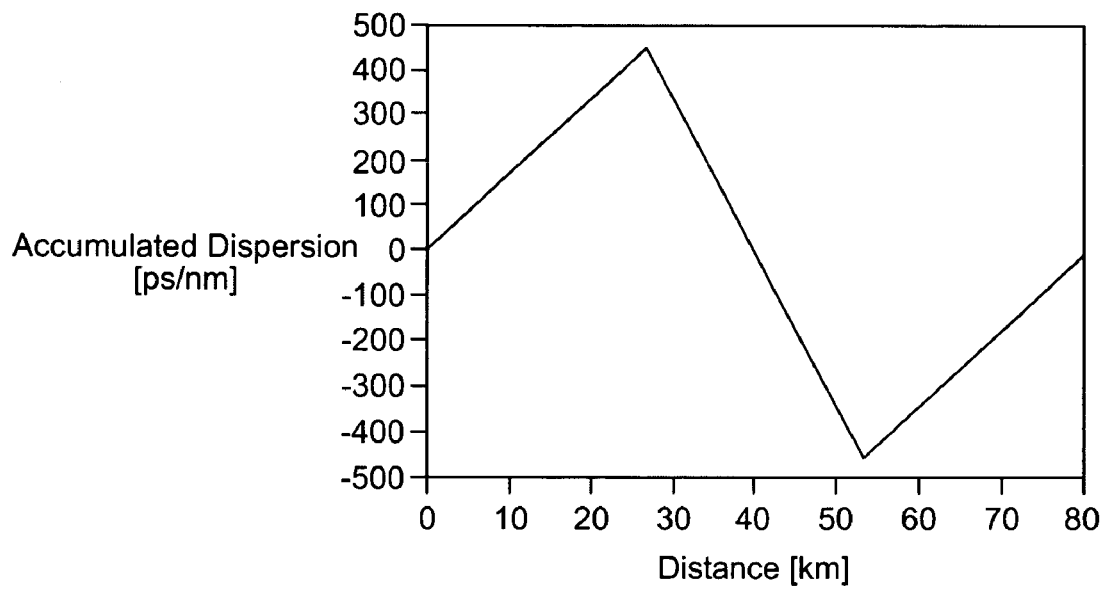
FIG. 8 shows a plot of the evolution of accumulated dispersion within a dispersion managed span comprised of a first optical fiber portion having a positive dispersion, a second optical fiber portion having a negative dispersion, and a third optical fiber portion having a positive dispersion.

FIG. 8 show the evolution of accumulated dispersion within an 80 km span comprised of a first optical fiber portion having a length of about 26.5 km and dispersion of about 17 ps/nm-km at a wavelength of 1550 nm, a second optical fiber portion having a length of about 27 km and dispersion of about −34 ps/nm-km at a wavelength of 1550 nm, and a third optical fiber portion having a length of about 26.5 km and dispersion of about 17 ps/nm-km at a wavelength of 1550 nm. The ratio of the lengths of the positive dispersion portions to the length of the negative dispersion portion is about 2 to 1. The absolute magnitude of the ratio of the negative dispersion to the positive dispersion is about 2 to 1.

Figure 9:
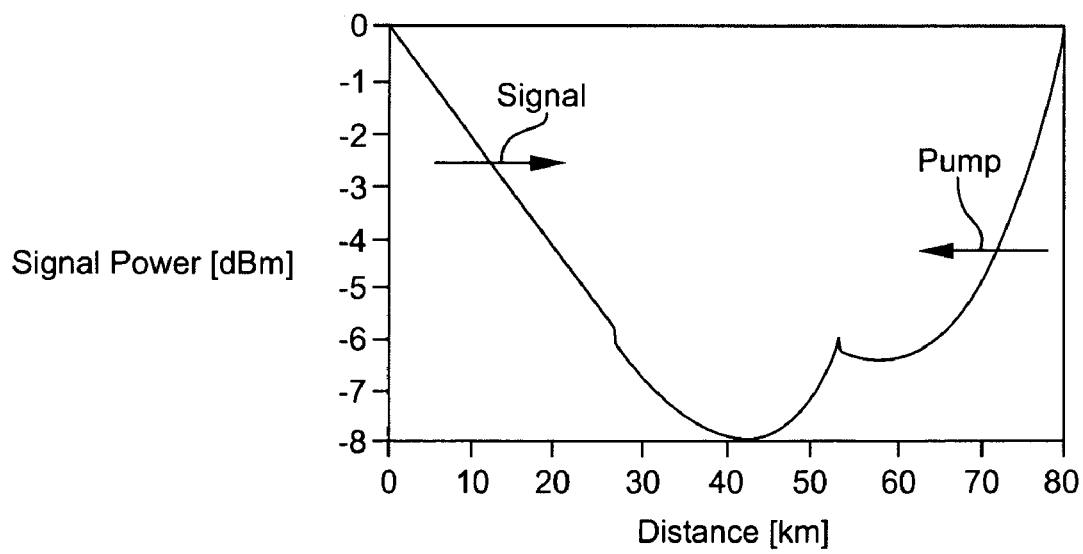
FIG. 9 shows a plot of the power evolution of the span of FIG. 8 with Raman amplification at the third optical fiber portion.

FIG. 9 shows the power evolution of the span of FIG. 8 with Raman amplification at the third optical fiber portion, wherein splice losses between the positive and negative dispersion fiber portions is included. In FIG. 9, the amount of Raman gain substantially equals the span loss, which is desirable but not required to obtain satisfactory results.

Figure 10:
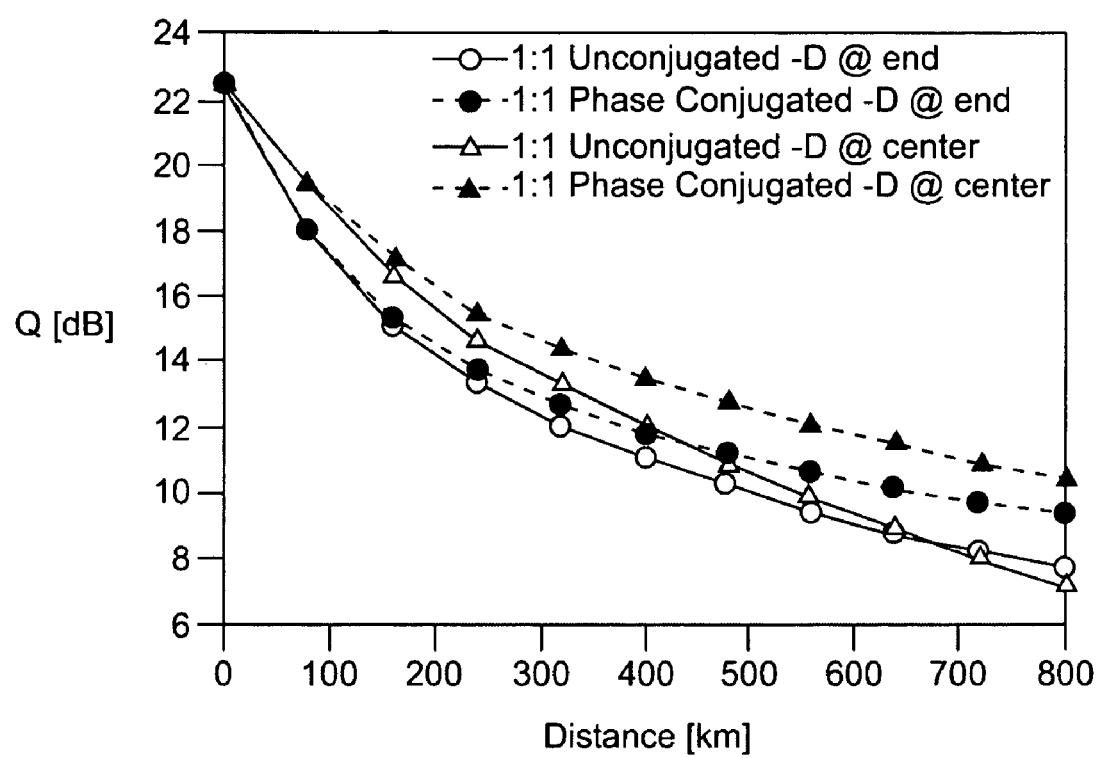
FIG. 10 shows a comparison of three system configurations and a system configuration as disclosed herein.

FIG. 10 shows the results of an EDFA-noise free simulation of a 40 Gb/s RZ system with Gaussian type pulses and a 50% duty cycle without Raman amplification for several different configurations. All configurations had a 1:1 mirror, where the ratio of the absolute magnitudes of the dispersions of the positive dispersion fiber and the negative dispersion fiber were substantially equal to one. In the first (comparative) configuration (represented by the non-filled circles in FIG. 10), the span had negative dispersion fiber situated at the end of the span (+D, −D span), and the span had no phase conjugation, similar to known configurations. In the second (comparative) configuration (represented by the filled circles in FIG. 10), the span had negative dispersion fiber situated at the end of the span (+D, −D span), and the span had phase conjugation, similar to known configurations. In the third (comparative) configuration (represented by the non-filled triangles in FIG. 10), the span had negative dispersion fiber situated at the center of the span (+D, −D, +D span), and the span had no phase conjugation, similar to known configurations. In the fourth configuration (represented by the filled triangles in FIG. 10), the span had negative dispersion fiber situated at the center of the span (+D, −D, +D span), and the span had phase conjugation, as disclosed herein. For configurations with phase conjugation, the simulation placed a phase conjugator at every amplifier location, however we found that similar results could be obtained by placing the phase conjugator in alternating amplifier locations (e.g. odd numbered amplifiers). As seen in FIG. 10, the best overall performance was obtained for the +D, −D, +D configuration with phase conjugation. Furthermore, the relative improvement of the phase conjugated over unconjugated results is better in the +D, −D, +D configuration as compared to the +D, −D configuration, i.e. the improvement due to phase conjugation for the +D, −D, +D configuration was even greater than the improvement due to phase conjugation for the +D, −D configuration.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. An optical transmission system for transmitting in a wavelength range, the system comprising:

a plurality of sequential optical component sites optically connected by a plurality of dispersion managed spans, the plurality of sequential optical component sites including first, second and third component sites;

wherein each dispersion managed span comprises M optical fiber portions of a first optical fiber type interconnected by N optical fiber portions of a second optical fiber type in an alternating arrangement of the first and second optical fiber types, wherein M is an even integer not less than two, and N is an odd integer not less than one;

wherein the optical fiber portions of each dispersion managed span have optical fiber portions of alternating first and second optical fiber types;

wherein the M optical fiber portions have a dispersion sign at a wavelength within the wavelength range, and wherein the N optical fiber portions have a dispersion sign at the wavelength opposite to the dispersion sign of the M optical fiber portions at the wavelength; and wherein the second optical component site includes an optical phase conjugator;

wherein the dispersion managed span connecting the first and second optical component sites has the same number of M and N optical fiber portions as the dispersion managed span connecting the second and third optical component sites.

2. The system of claim 1 wherein at least one of the first and third optical component sites includes an optical phase conjugator.

3. The system of claim 1 wherein the dispersion managed span connecting the first and second optical component sites comprises an optical fiber portion of the first optical fiber type coupled to the first optical component site, and an optical fiber portion of the first optical fiber type coupled to the second optical component site.

4. The system of claim 1 wherein the dispersion managed span connecting the second and third optical component sites comprises an optical fiber portion of the first optical fiber type coupled to the second optical component site, and an optical fiber portion of the first optical fiber type coupled to the third optical component site.

5. The system of claim 1 wherein at least one of the first, second and third optical component sites includes an optical amplifier.

6. The system of claim 5 wherein at least one of the first, second and third optical component sites includes a two stage optical amplifier.

7. The system of claim 1 wherein the second optical component site includes a two stage optical amplifier, and wherein the optical phase conjugator is disposed mid-stage within the two stage optical amplifier.

8. The system of claim 1 further comprising a Raman amplifier optically coupled to an optical fiber portion adjacent the second optical component site.

9. The system of claim 8 wherein the Raman amplifier is disposed at the second optical component site.

10. The system of claim 1, further comprising a plurality of sets of sequential dispersion managed spans, each set comprising respective first and second dispersion managed spans optically coupled by a respective optical phase conjugator.

11. The system of claim 1, further comprising:

a transmitter optically coupled to the optical network, wherein the transmitter launches an optical signal into the optical network; and a receiver optically coupled to the optical network, wherein the receiver receives the optical signal from the optical network.

12. An optical transmission system for transmitting in a wavelength range, the system comprising:
- a first optical fiber line comprising first, second, and third sequential optical fiber portions, wherein the first optical fiber portion has a dispersion with a first dispersion sign at a wavelength within the wavelength range, wherein the second optical fiber portion has a dispersion with a second dispersion sign at the wavelength opposite to the first dispersion sign, and wherein the third optical fiber portion has a dispersion with the first dispersion sign at the wavelength;
- a second optical fiber line comprising first, second, and third sequential optical fiber portions, wherein the first optical fiber portion has a dispersion with the first dispersion sign at the wavelength, wherein the second optical fiber portion has a dispersion with the second dispersion sign at the wavelength, and wherein the third optical fiber portion has the first dispersion sign at the wavelength; and
- an optical phase conjugator disposed between the first and second optical fiber lines, wherein the optical phase conjugator is optically coupled to the third optical fiber portion of the first optical fiber line and is optically coupled to the first optical fiber portion of the second optical fiber line.

13. The system of claim 12 wherein the first and third fiber portions of both the first and second fiber lines comprise the same fiber type.

14. The system of claim 12 wherein the second fiber portions of both the first and second fiber lines comprise the same fiber type.

15. The system of claim 12 further comprising an optical amplifier disposed between, and optically coupled to, the third fiber portion of the first optical fiber line and the optical phase conjugator.

16. The system of claim 12 further comprising an optical amplifier disposed between, and optically coupled to, the optical phase conjugator and the first fiber portion of the second optical fiber line.

17. The system of claim 12 further comprising a two-stage amplifier disposed between, and optically coupled to, the first and second optical fiber lines.

18. The system of claim 17 wherein the optical phase conjugator is disposed mid-stage in the two-stage amplifier.

19. The system of claim 17 further comprising an optical network comprised of a plurality of network portions, each network portion comprising at least one sequential set.

20. The system of claim 17, further comprising:
- a transmitter optically coupled to the optical network, wherein the transmitter launches an optical signal into the optical network; and
- a receiver optically coupled to the optical network, wherein the receiver receives the optical signal from the optical network.

* * * * *